US011887217B2

(12) United States Patent
Maheshwari et al.

(10) Patent No.: US 11,887,217 B2
(45) Date of Patent: Jan. 30, 2024

(54) TEXT EDITING OF DIGITAL IMAGES

(71) Applicant: Adobe Inc., San Jose, CA (US)

(72) Inventors: Paridhi Maheshwari, Bhopal (IN); Vishwa Vinay, Bangalore (IN); Shraiysh Vaishay, Jhansi (IN); Praneetha Vaddamanu, Hyderabad (IN); Nihal Jain, Andheri (IN); Dhananjay Bhausaheb Raut, Aurangabad (IN)

(73) Assignee: Adobe Inc., San Jose, CA (US)

( * ) Notice: Subject to any disclaimer, the term of this patent is extended or adjusted under 35 U.S.C. 154(b) by 469 days.

(21) Appl. No.: 17/079,844

(22) Filed: Oct. 26, 2020

(65) Prior Publication Data

US 2022/0130078 A1 Apr. 28, 2022

(51) Int. Cl.
*G06T 11/00* (2006.01)
*G06F 40/30* (2020.01)
*G06V 10/40* (2022.01)

(52) U.S. Cl.
CPC ............ *G06T 11/001* (2013.01); *G06F 40/30* (2020.01); *G06V 10/40* (2022.01); *G06T 2207/10024* (2013.01); *G06T 2207/20081* (2013.01)

(58) Field of Classification Search
CPC ......... G06T 11/001; G06T 2207/10024; G06T 2207/20081; G06V 10/40
See application file for complete search history.

(56) References Cited

U.S. PATENT DOCUMENTS

| | | | |
|---|---|---|---|
| 5,579,471 A | 11/1996 | Barber et al. | |
| 6,411,953 B1 | 6/2002 | Ganapathy et al. | |
| 6,430,312 B1 | 8/2002 | Huang et al. | |
| 6,621,926 B1 | 9/2003 | Yoon et al. | |
| 6,801,657 B1 | 10/2004 | Cieplinski | |
| 7,236,652 B2 | 6/2007 | Kasutani | |
| 10,713,821 B1 * | 7/2020 | Surya | G06N 3/045 |
| 11,216,505 B2 | 1/2022 | Motiian et al. | |

(Continued)

FOREIGN PATENT DOCUMENTS

CN 111062865 A 4/2020

OTHER PUBLICATIONS

U.S. Appl. No. 17/079,844, "Restriction Requirement", U.S. Appl. No. 17/079,844, dated Jan. 10, 2023, 6 pages.

(Continued)

*Primary Examiner* — Kevin Ky
(74) *Attorney, Agent, or Firm* — FIG. 1 Patents

(57) ABSTRACT

Digital image text editing techniques as implemented by an image processing system are described that support increased user interaction in the creation and editing of digital images through understanding a content creator's intent as expressed using text. In one example, a text user input is received by a text input module. The text user input describes a visual object and a visual attribute, in which the visual object specifies a visual context of the visual attribute. A feature representation generated by a text-to-feature system using a machine-learning module based on the text user input. The feature representation is passed to an image editing system to edit a digital object in a digital image, e.g., by applying a texture to an outline of the digital object within the digital image.

20 Claims, 11 Drawing Sheets
(3 of 11 Drawing Sheet(s) Filed in Color)

(56) References Cited

U.S. PATENT DOCUMENTS

| | | | |
|---|---|---|---|
| 11,669,566 | B2 | 6/2023 | Motiian et al. |
| 2002/0122587 | A1 | 9/2002 | Lim et al. |
| 2003/0128298 | A1 | 7/2003 | Moon et al. |
| 2005/0084154 | A1 | 4/2005 | Mingjing et al. |
| 2005/0093880 | A1 | 5/2005 | Kim |
| 2006/0050993 | A1 | 3/2006 | Stentiford |
| 2008/0240561 | A1 | 10/2008 | Kuwahara |
| 2009/0304229 | A1 | 12/2009 | Hampapur et al. |
| 2010/0104207 | A1 | 4/2010 | Chan et al. |
| 2010/0226532 | A1 | 9/2010 | Hayasaka et al. |
| 2010/0316290 | A1 | 12/2010 | Jia |
| 2011/0029561 | A1 | 2/2011 | Slaney et al. |
| 2011/0200251 | A1 | 8/2011 | Chin et al. |
| 2012/0170838 | A1 | 7/2012 | Wang et al. |
| 2012/0224787 | A1 | 9/2012 | Imai |
| 2014/0254927 | A1 | 9/2014 | Bhardwaj et al. |
| 2015/0049943 | A1 | 2/2015 | Hamsici |
| 2015/0324394 | A1 | 11/2015 | Becker et al. |
| 2015/0324662 | A1 | 11/2015 | Garg et al. |
| 2016/0048536 | A1 | 2/2016 | Di et al. |
| 2017/0161919 | A1 | 6/2017 | Schroeder et al. |
| 2017/0301085 | A1* | 10/2017 | Riklin Raviv ......... G16H 40/63 |
| 2019/0278844 | A1 | 9/2019 | Brixey et al. |
| 2020/0160042 | A1 | 5/2020 | Bui et al. |
| 2021/0118165 | A1* | 4/2021 | Strong ................. G06T 7/194 |
| 2021/0158503 | A1* | 5/2021 | Li ........................ G06F 18/214 |
| 2021/0209509 | A1* | 7/2021 | Martin ................. G06F 16/258 |
| 2022/0068296 | A1* | 3/2022 | Wilson ................. G06T 13/205 |
| 2022/0121705 | A1 | 4/2022 | Motiian et al. |
| 2022/0122308 | A1* | 4/2022 | Kalarot ................ G06F 18/214 |

OTHER PUBLICATIONS

U.S. Appl. No. 17/565,816 , "Non-Final Office Action", U.S. Appl. No. 17/565,816, dated Dec. 8, 2022, 17 pages.

2214904.1 , "Combined Search and Examination Report", GB Application No. 2214904.1, dated Nov. 2, 2022, 4 pages.

Li, Wu , "Multi-Resolution of Image Retrieval in Image Databases System", 2010 International Conference on Artificial Intelligence and Computational Intelligence [retrieved Dec. 19, 2022]. Retrieved from the Internet <https://doi.org/10.1109/AICI.2010.173>, Dec. 8, 2022, 4 pages.

"Non-Final Office Action", U.S. Appl. No. 16/561,973, dated Jun. 1, 2021, 14 pages.

"Notice of Allowance", U.S. Appl. No. 16/561,973, dated Aug. 30, 2021, 8 pages.

Jeong, Sangoh et al., "Image retrieval using color histograms generated by Gauss mixture vector quantization", Computer Vision and Image Understanding, vol. 94, No. 1-3 [retrieved Jun. 3, 2021]. Retrieved from the Internet <https://doi.org/10.1016/j.cviu.2003.10.015>., Oct. 15, 2003, 23 pages.

"Foreign Office Action", GB Application No. 2112183.5, dated Feb. 2, 2022, 7 pages.

"Colorize Image on Pinetools [online]", PINETOOLS, 2020, [retrieved on Nov. 24, 2020], Retrieved from the Internet: <URL:https://pinetools.com/colorize-image>., 2020, 2 pages.

"Colorize Images [online]", Manytools [retrieved Dec. 22, 2020]. Retrieved from the Internet: <https://manytools.org/image/colorize-filter/>., 2020, 3 pages.

"Colorize Photos options on Algorithmia [online]", Algorithmia [retrieved on Nov. 24, 2020], Retrieved from the Internet: <URL:https://demos.algorithmia.com/colorize-photos>., 2020, 4 pages.

"Image Colorizer [online]", Image Colorizer [retrieved on Dec. 22, 2020], Retrieved from the Internet: <URL:https://imagecolorizer.com/>., 2020, 4 pages.

"U.S. Appl. No. 16/561,973", filed Sep. 5, 2019, filed Sep. 5, 2019, 70 pages.

Randall , "Color Survey Results", xkcd, 2010, [retrieved on Nov. 24, 2020], Retrieved from the Internet: <URL:blog.xkcd.com/2010/05/03/color-survey-results/>., May 3, 2010, 20 pages.

Bahng, Hyojin et al., "Coloring with Words: Guiding Image Colorization Through Text-based Palette Generation", University of California, Berkeley, 2018, [retrieved on Nov. 24, 2020], Retrieved from the Internet: <URL:https://arxiv.org/pdf/1804.04128.pdf>., Aug. 7, 2018, 25 pages.

Berlin, Brent et al., "Basic color terms: Their universality and evolution", California Univ., Berkeley, Lang .-Behav. Res. Lab, [retrieved on Nov. 24, 2020], Retrieved from the Internet: <URL:https://files.eric.ed.gov/fulltext/ED019655.pdf>, Mar. 15, 1999, 80 pages.

Chang, Huiwen et al., "Palette-based Photo Recoloring", Princeton University, 2015, [retrieved on Nov. 24, 2020], Retrieved from the Internet: <URL:https://gfx.cs.princeton.edu/pubs/Chang_2015_PPR/chang2015-palette_small.pdf>., Jul. 27, 2015, 11 pages.

Chen, Yanbei et al., "Image Search with Text Feedback by Visiolinguistic Attention Learning", Queen Mary University of London, 2020, [retrieved on Nov. 24, 2020], Retrieved from the Internet: <URL:http://www.eecs.qmul.ac.uk/~sgg/papers/ChenEtAl_CVPR2020.pdf>., Jun. 2020, 11 pages.

He, Kaiming et al., "Deep Residual Learning for Image Recognition", Proceedings of the IEEE conference on computer vision and pattern recognition, 2016 [retrieved on Nov. 24, 2020], Retrieved from the Internet: <URL:https://arxiv.org/pdf/1512.03385.pdf>., Dec. 10, 2015, 12 pages.

Jegou, Herve et al., "Product Quantization for Nearest Neighbor Search", Mar. 2010, 14 pages.

Jetley, Saumya et al., "Learn to Pay Attention", International Conference on Learning Representations, 2018, [retrieved on Nov. 24, 2020], Retrieved from the Internet: <URL:https://arxiv.org/pdf/1804.02391.pdf>., Apr. 26, 2018, 14 pages.

Liu, Ziwei et al., "DeepFashion: Powering Robust Clothes Recognition and Retrieval with Rich Annotations", Proceedings of the IEEE Conference on Computer Vision and Pattern Recognition (CVPR) [retrieved on Nov. 24, 2020], Retrieved from the Internet: <URL:https://openaccess.thecvf.com/content_cvpr_2016/papers/Liu_DeepFashion_Powering_Robust_CVPR_2016_paper.pdf>., Jun. 2016, 9 pages.

Mao, Xudong et al., "Least Squares Generative Adversarial Networks", IEEE, 2017, [retrieved on Nov. 24, 2020], Retrieved from the Internet: <URL:https://arxiv.org/pdf/1611.04076.pdf>, Apr. 5, 2017, 16 pages.

Michel, Jean-Baptiste et al., "Quantitative Analysis of Culture Using Millions of Digitized Books", Science, 2011, [retrieved on Nov. 24, 2020], Retrieved from the Internet: <URL:https://dash.harvard.edu/bitstream/handle/1/8899722/MichelScience2011.pdf?sequence=1&isAllowed=y>., Jan. 14, 2011, 15 pages.

Misra, Ishan et al., "From Red Wine to Red Tomato: Composition with Context", The Robotics Institute, 2017, [retrieved on Nov. 24, 2020], Retrieved from the Internet: <URL:https://www.ri.cmu.edu/wp-content/uploads/2017/12/composing_cvpr17.pdf>, Jul. 2017, 10 pages.

Pennington, Jeffrey et al., "GloVe: Global Vectors for Word Representation", Computer Science Department, Stanford University, Stanford, CA 94305, 2014, [retrieved on Nov. 24, 2020], Retrieved from the Internet: <URL:https://nlp.stanford.edu/pubs/glove.pdf>., Sep. 2014, 12 pages.

Svadja, Hep , "Color Your Spring with Adobe Color Gradients", Creative Inspiration & Trends, 2020, [retrieved on Nov. 24, 2020], Retrieved from the Internet: <URL:theblog.adobe.com/color-your-spring-with-adobe-color-gradients/>., Apr. 27, 2020, 9 pages.

Vedaldi, Andrea et al., "Efficient Additive Kernels via Explicit Feature Maps", Dept. of Engineering Science, University of Oxford, UK, 2012, [retrieved on Nov. 24, 2020], Retrieved from the Internet: <URL:https://www.robots.ox.ac.uk/~vgg/publications/2010/Vedaldi10/vedaldi10.pdf>., Jun. 2011, 8 pages.

Vo, Nam et al., "Composing Text and Image for Image Retrieval—An Empirical Odyssey", IEEE [retrieved on Nov. 24, 2020], Retrieved from the Internet: <URL:https://arxiv.org/pdf/1812.07119.pdf>., Dec. 18, 2018, 9 pages.

Wang, Xin et al., "Task-Aware Feature Generation for Zero-Shot Compositional Learning", UC Berkeley [retrieved on Nov. 24, 2020], Retrieved from the Internet: <URL:https://arxiv.org/pdf/1906.04854.pdf>., Mar. 23, 2020, 17 pages.

(56) References Cited

OTHER PUBLICATIONS

Wei, Kun et al., "Adversarial Fine-Grained Composition Learning for Unseen Attribute-Object Recognition", ICCV, 2019, [retrieved on Nov. 24, 2020], Retrieved from the Internet: <URL:https://openaccess.thecvf.com/content_ICCV_2019/papers/Wei_Adversarial_Fine-Grained_Composition_Learning_for_Unseen_Attribute-Object_Recognition_ICCV_2019_paper.pdf>., Nov. 2019, 9 pages.

Xian, Wenqi et al., "TextureGAN: Controlling Deep Image Synthesis with Texture Patches", Georgia Institute of Technology, 2018, [retrieved on Nov. 24, 2020], Retrieved from the Internet: <URL:https://arxiv.org/pdf/1706.02823.pdf>., Apr. 14, 2018, 10 pages.

Yu, Aron et al., "Fine-Grained Visual Comparisons with Local Learning", University of Texas at Austin, 2014, [retrieved on Nov. 24, 2020], Retrieved from the Internet: <URL:https://www.cs.utexas.edu/~grauman/papers/yu-cvpr2014.pdf>., Jun. 2014, 8 pages.

Zhang, Richard et al., "Colorful Image Colorization", University of California, Berkeley, 2016, [retrieved on Nov. 24, 2020], Retrieved from the Internet: <URL:https://arxiv.org/pdf/1603.08511.pdf>, Oct. 5, 2016, 29 pages.

Zhu, Jun-Yan et al., "Generative Visual Manipulation on the Natural Image Manifold", University of California, Berkeley, 2018, [retrieved on Nov. 24, 2020], Retrieved from the Internet: <URL:https://arxiv.org/pdf/1609.03552.pdf>., Dec. 16, 2018, 16 pages.

U.S. Appl. No. 17/565,816 , "Corrected Notice of Allowability", U.S. Appl. No. 17/565,816, dated Apr. 14, 2023, 2 pages.

U.S. Appl. No. 17/565,816 , "Notice of Allowance", U.S. Appl. No. 17/565,816, dated Mar. 14, 2023, 9 pages.

\* cited by examiner

TEXT EDITING OF DIGITAL IMAGES

BACKGROUND

Image processing systems support a multitude of functionality to create and edit digital images. As part of this, these systems as implemented by a computing device support a variety of tools, filters, colors, fonts, and so on to expand both the ways in which digital images are created and visual appearance of the digital images. Therefore, content creators using these image processing systems are typically tasked with acquiring specialized knowledge in order to access this functionality.

However, even in instances in which this specialized knowledge is acquired, the variety and ways in which this functionality is implemented in conventional image processing systems is inefficient, both with respect to how users access this functionality as well as computational resources used to support the functionality. Consider an example in which a content creator desires to capture subtle nuances of color in creating a digital image. Conventionally, this involves manual selection of RGB color values, which is a time consuming and tedious task that also results in inefficient consumption of computational resources used to support this selection and reselection in order to achieve a desired result. Consequently, content creators often forgo these conventional techniques to capture these nuances or are forced to commit significant amounts of resources to do so.

SUMMARY

Digital image text editing techniques as implemented by an image processing system are described that support increased user interaction in the creation and editing of digital images through understanding a content creator's intent as expressed using text. In one example, a text user input is received by a text input module. The text user input describes a visual object and a visual attribute, in which the visual object specifies a visual context of the visual attribute, e.g., "lush lawn." A feature representation is generated by a text-to-feature system using a machine-learning module based on the text user input. The text-to-feature system, for instance, generates the feature representation to represent visual features evoked by text, such as color, texture, luminance, and so forth. In the instance of a color profile, the feature representation includes a plurality of colors typically inspired in a user's imagination upon hearing/reading the text user input, such as darker browns for "dry leaves."

The feature representation is then passed to the image editing system to edit the digital object in the digital image. To begin, the image editing system segments the digital object from the digital image to form an outline, e.g., using edge detection techniques. The image editing system also generates a color gradient from the color profile of the feature representation. The color gradient is then passed to a texture system to edit the digital object within the digital image. The texture system, for instance, employs a machine-learning model trained as part of a generative adversarial network (GAN) to fill in the outline based at least in part of the color gradient generated from the feature representation, which is then output for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
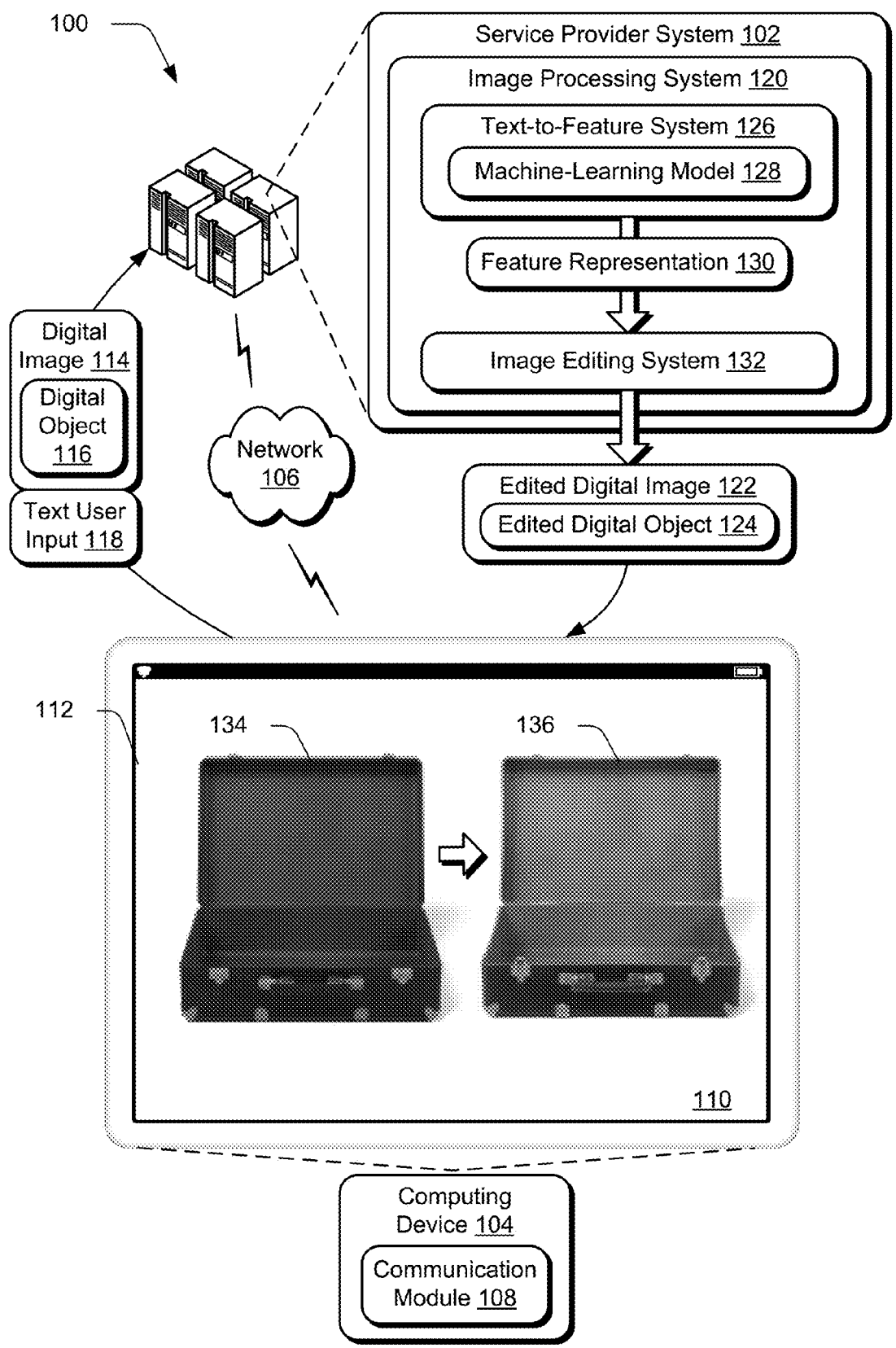
FIG. 1 is an illustration of an environment in an example implementation that is operable to employ text editing techniques for digital images as described herein.

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Conventional techniques that are made available to content creators to access functionality of a computing device to create and edit digital images typically involve complex interactions that, although attempting to increase an ability to capture nuances intended by the creators, are difficult to navigate. Thus, computing devices that implement these conventional techniques encounter inefficiencies in making this functionality available to content creators as well as result in inefficient consumption of computational resources used to support this functionality.

Accordingly, digital image text editing techniques as implemented by an image processing system are described that support increased user interaction in the creation and editing of digital images through understanding a content creator's intent as expressed using text. As part of this, the image processing system leverages compositionality and context indicated by the text to edit features of a digital image, e.g., to edit color of a digital object included in a digital image.

Compositionality is the nature of components that make up the digital image. Context references digital objects surrounding a focal point. By leveraging compositionality and context as expressed in text, the image processing system gains an increased understanding of an intent in editing a feature, e.g., color of a digital object for a digital image. For example, a text user input may incorporate a structure of an attribute-object relationship, e.g., "raw mango," "rusty car," and so forth. The object defines a context for the attribute and as such guides the features that are expressed. For example, colors that represent "hot pepper" vary from colors that represent "hot sun." Understanding the role that the attributes (e.g., adjectives) play on the related objects in the text thus supports an ability of the image processing system to derive useful characteristics for downstream image processing tasks. Further, composition and context are also usable to extend knowledge from known visual features to learn and generalize to previously unseen visual features. For example, an image processing system having learned features involved in digital objects such as "bottle" and "car" and the concept "metallic car" can be used to predict a feature representation of visual characteristics of a previously unseen concept "metallic bottle."

In an example in which the feature of the digital image to be edited is color, the image processing system first curates a dataset of digital images that are used to train a model using machine learning. The image processing system begins by collecting bigrams, e.g., as a list of each contiguous sequence of two words present in a text corpus. Attribute-object pairs are then formed by the image processing system in which a first word is an attribute (e.g., adjective) and a second word refers to an object, e.g., noun. Filtering is performed by the system to remove pairs that are not indicative of the feature, e.g., to remove "epithelial cells" that does not express intent relevant to the feature "color." The filtered pairs are then used as a search query to perform an image search of digital images. A result of the image search includes training digital images. Training text is formed from the text queries used to perform the image search for training text. Training feature representations are formed from the training digital images, e.g., as color profiles.

A model is then trained by the image processing system using machine learning to generate a feature representation based on a text user input, solely. Continuing with the color example above, the feature representation includes colors that are used to represent the attribute-object pair, e.g., "ripe mango," "hot pepper," and so on. In one example, the image processing system implements a generative adversarial network (GAN) in which a generator module includes a first machine-learning model (e.g., neural network) that is trained to learn the feature representation from the training text. The GAN also includes a discriminator module having a second machine-learning model (e.g., neural network) which classifies candidate feature representations generated by the first model as "real" or "fake" in order to train the generator module, i.e., the first model.

During training, the generator module accepts as an input the training text used to locate respective training digital images as described above, which is used to generate a candidate feature representation. The discriminator module accepts as an input the candidate feature representation, image features extracted from the training digital image, and the training text input. Based on this, the discriminator module outputs a score, derived in part from image modality learned from the image features, to guide learning of the generator module and more particularly the first model. Once trained, the generator module is configured to generate a feature representation (e.g., a color profile) based solely on a text user input.

Consider an example in which a content creator views a digital object included in a digital image output in a user interface. The digital object in this example is a purse having a leather color and texture and the content creator is tasked with creating different colors and textures for the purse. Rather than manually selecting particular RGB colors, a text user input is provided by the content creator via the user interface that succinctly captures subtle variations in features to be expressed by editing the digital object. The content creator, for instance, enters a text user input of "ripe mango" and in response the image processing system generates a feature representation of colors evoked by the text using the trained model above, e.g., as a color profile. This feature representation is then used by the image processing system to color and texturize the digital object (e.g., the purse) for display in the user interface, automatically and without further user intervention responsive to the text user input.

A variety of techniques are usable to leverage the feature representation in editing the digital object. Continuing with the color example above, a feature representation of "ripe mango" generated by the model through machine learning includes a plurality of colors as a color profile. The color profile is provided as an input to an image editing system, which generates a color gradient from the color profile, e.g., through filtering, sorting, and blurring. The image editing system also generates an outline of the digital object using an outline generation module, e.g., using edge detection techniques.

The color gradient, outline, and a texture are then passed as an input to a texture system of the image editing system. The texture system includes a model training through machine learning (e.g., a texture generative adversarial network) to color and texturize the outline using the color gradient and the texture to generate an edited digital object, e.g., the purse as colored and textured to have an appearance of "ripe mango." In this way, the image processing system leverages associations between attributes and objects in the text user input in which the objects provide a visual context to the attributes that are innate in human perception to improve user efficiency in interacting with the image processing system. Although color is described as an example of features that are learned and used as a basis for editing a digital object in a digital image in the following sections, a variety of other visual features are also contemplated, such as texture, contrast, lighting, luminance, and so forth.

Term Examples

A "text user input" is a user input that includes text. Entry of the text is performable directly, e.g., using a keyboard or gesture, or indirectly, e.g., using speech-to-text techniques.

A "feature representation" is an encoding generated using machine learning as representative of a corresponding feature. In an example of a feature representation of color, the feature representation is a color palette including colors evoked by corresponding text, e.g., browns and golds for "dry leaves."

A "digital object" is a collection of pixels defined within a digital image representative of a particular item.

An "outline" is a line or set of lines enclosing or indicating a shape of a digital object within a digital image.

A "visual attribute" is a visual quality or feature regarding as a characteristic or inherent part of someone or something, e.g., a corresponding visual object. A "visual object" defines a context of the visual attribute, "leaves" as a visual object for the visual attribute of "dry."

"Compositionality" is the nature of components that make up the digital image. For example, compositionality is a principle that a meaning of a complex expression is determined by a meaning of its constituent expressions.

"Context" references digital objects surrounding a focal point. Context is a frame that surrounds the event and provides resources for its appropriate interpretation.

A "generative adversarial network" (GAN) is a machine learning technique in which a generator module includes a first machine-learning model (e.g., neural network) that is trained to learn the feature representation from the training text. The GAN also includes a discriminator module having a second machine-learning model (e.g., neural network) which classifies candidate feature representations generated by the first model as "real" or "fake" in order to train the generator module, i.e., the first model.

A "color gradient" specifies a range of position-dependent colors that vary continuously by position and are usable to fill a region, e.g., an outline.

In the following discussion, an example environment is described that employs the techniques described herein. Example procedures are also described that are performed in the example environment as well as in other environments. Consequently, performance of the example procedures is not limited to the example environment and the example environment is not limited to performance of the example procedures.

Example Environment

FIG. 1 is an illustration of a digital medium environment 100 in an example implementation that is operable to employ text editing techniques for digital images as described herein. The illustrated environment 100 includes a service provider system 102 and a computing device 104 that are communicatively coupled, one to another, via a network 106, e.g., the Internet. Computing devices that implement the service provider system 102 and the computing device 104 are configurable in a variety of ways.

A computing device, for instance, is configurable as a desktop computer, a laptop computer, a mobile device (e.g., assuming a handheld configuration such as a tablet or mobile phone as illustrated), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is described in some instances, a computing device is also representative of a plurality of different devices, such as multiple servers utilized by a business to perform operations "over the cloud" as illustrated for the service provider system 102 and as described in greater detail in relation to FIG. 11.

The computing device 104 is illustrated as including a communication module 108 that is representative of functionality executable to communicate with the service provider system 102 via the network 106, e.g., as a browser, a network-enabled application, and so forth. A user interface 110 is also illustrated as rendered by a display device 112 of the computing device 104. A digital image 114 including a digital object 116 and a text user input 118 are communicated by the communication module 108 via the network 106 to an image processing system 120 of the service provider system 102. The image processing system 120 is configured to generate an edited digital image 122 having an edited digital object 124 based on features corresponding to the text user input 118. Although functionality of the image processing system 120 is illustrated as remote to the computing device 104 in this example. This functionality is also capable of being implemented locally at the computing device 104, further divided across additional systems, and so on.

As previously described, the image processing system 120 is configured to edit the digital object 116 responsive to the text user input 118, automatically and without further user intervention. To do so, the image processing system 120 employs a text-to-feature system 126 having a machine-learning model 128 to generate a feature representation 130, e.g., of visual features viewable by a user when rendered as part of a digital image. The feature representation 130 is passed as an input to an image editing system 132 to generate the edited digital object 124 from the digital object 116 included in the digital image 114. The feature representation 130 thus visually expresses what is indicated by the text user input 118.

In the illustrated example, the digital object 116 is rendered 134 in the user interface 110 in grayscale. The text user input 118 includes an attribute-object pair, such as "dry leaves." The text user input 118 is processed by the text-to-feature system 126 to generate a feature representation 130 of colors evoked by that text and as such reflects an intent of a user that provided the input. The feature representation 130 is then used by the image editing system 132 to generate the edited digital object 124 based on the colors indicated by the feature representation 130 in this example, which is illustrated as a rendering 136 of the edited digital object 124 as including browns and golds typically thought of as included in dry leaves.

In this way, the text user input 118 is leveraged by the image processing system 120 to gain insight into a user's intent in editing of the digital image 114, e.g., in terms of real-world descriptions of physical objects. The object specified in the text user input 118 (e.g., as a reference to a physical object in the real world) provides a context for the attribute specified by the text user input 118. Further, the object specified by the text user input 118 may or may not correspond to the digital object being edited, e.g., "leaves" in the text user input 118 to provide context to the attribute "dry" that is used as a basis to edit the digital object of a "briefcase." This reduces an amount of effort of the user involved in specifying this intent by leveraging intuitions gained from real world scenarios involving physical objects and attributes of those objects.

Continuing with the illustrated example, the text user input 118 of "dry leaves" captures rich visuals as opposed directly indicating a color (e.g., brown) and is more intuitive than "light goldish-brown." Such textual descriptions help in capturing subtle information about object appearance and increases efficiency and effectiveness of the user experience. Support of this text input modality not only widens the scope (by allowing a better expression of intent) of functionality supported by the image processing system 120, but also makes this functionality available to a wider range of potential users, e.g., by not involving specialized knowledge. Although attribute-object pairs are described in the following examples, these techniques are equally applicable to phrases having any arbitrary length in the text user input 118.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Text Editing of Digital Images

Figure 2:
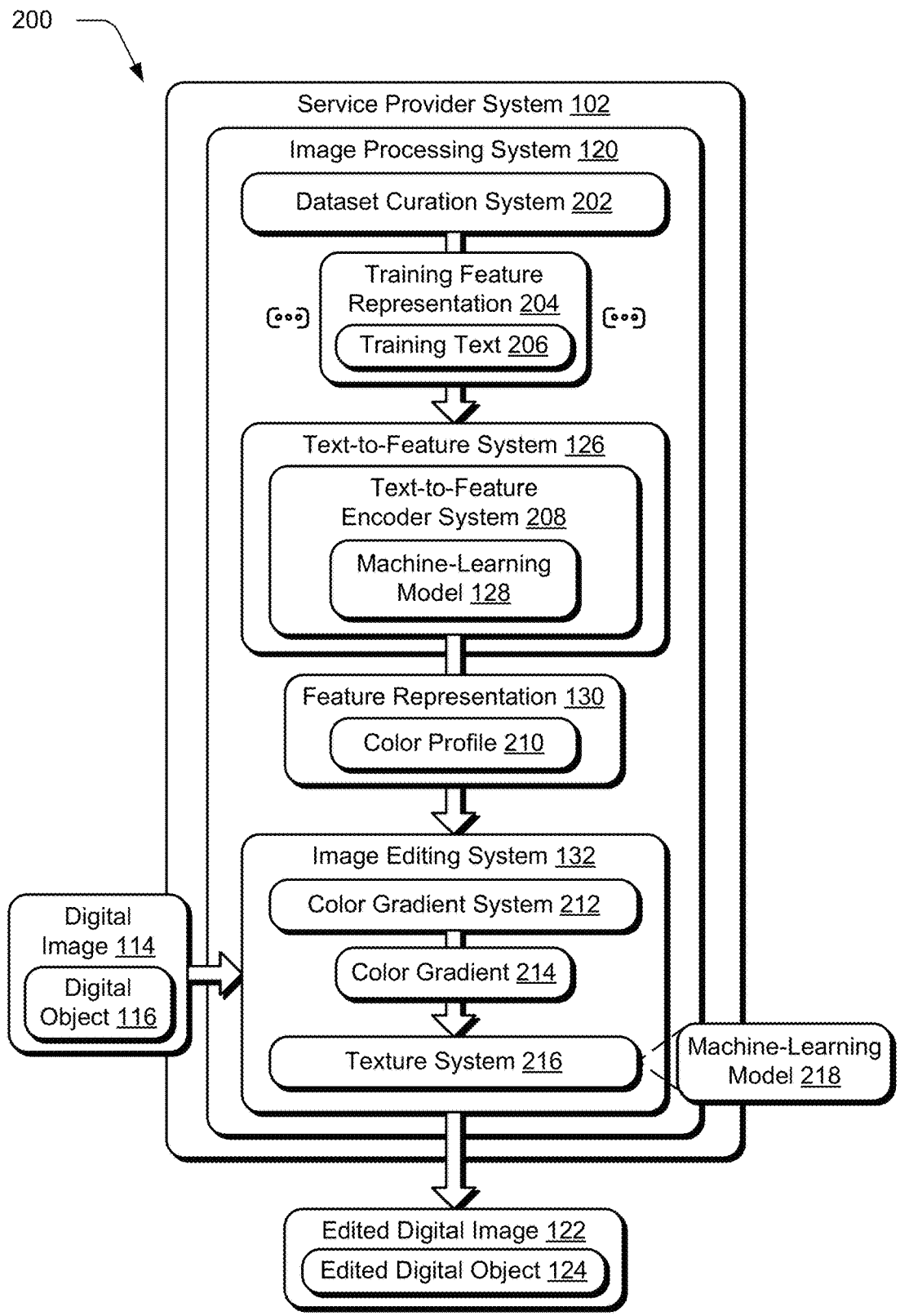
FIG. 2 depicts a system showing operation of an image processing system of FIG. 1 in greater detail as including a pipeline to curate a training dataset, train a machine-learning model based on the training dataset to generate a feature representation based on text, and edit a digital object in a digital image based on the feature representation.

FIG. 2 depicts a system 200 showing operation of the image processing system 120 of FIG. 1 in greater detail as including a pipeline to curate a training dataset, train a machine-learning model based on the training dataset to generate a feature representation based on text, and edit a digital object in a digital image based on the feature representation. The pipeline in this example starts with a dataset curation system 202 that is configured to generate a training dataset of training feature representations 204 and associated training text 206. The training feature representations 204 are generated from digital images curated to reflect visual features that are expressed by the training text, e.g., color, visual effects, and so forth. Further discussion of operation of the dataset curation system 202 is described in relation to FIG. 3.

The training feature representations 204 and training text 206 are passed as an input to the text-to-feature system 126 to train the machine-learning model 128 as part of a text-to-feature encoder system 208 to generate the feature representation 130. In an example in which the feature is color, the machine-learning model 128 is trained to generate the feature representation 130 as a color profile 210 (e.g., color histogram) that represents colors evoked by a text user input 118. Further discussion of operation of the text-to-feature system 126 in training the machine-learning model 128 as part of a generative adversarial network (GAN) is described in relation to FIG. 4 and examples of feature representations configured as color profiles for associated text are depicted in FIG. 5.

The feature representation is then passed to an image editing system 132. The image editing system 132 employs a heuristic based approach represented by a color gradient system 212. The color gradient system 212 is configured to extract a color gradient 214 from the color profile 210 of the feature representation 130, which is shown and described in greater detail in relation to FIG. 6. The color gradient 214 is then provided as an input to a texture system 216 that employs a machine-learning model 218 (e.g., trained as part of a texture GAN) to generate the edited digital image 122 and the edited digital object 124 based on a text user input 118. Further discussion of operation of the texture system 216 in training the machine-learning model 218 as part of a generative adversarial network (GAN) is described in relation to FIGS. 7 and 8. Further discussion of operation of the texture system 216 in use of the trained machine-learning model 218 as part of the text editing pipeline is depicted and described in relation to FIGS. 9 and 10.

Feature Representations

Figure 3:
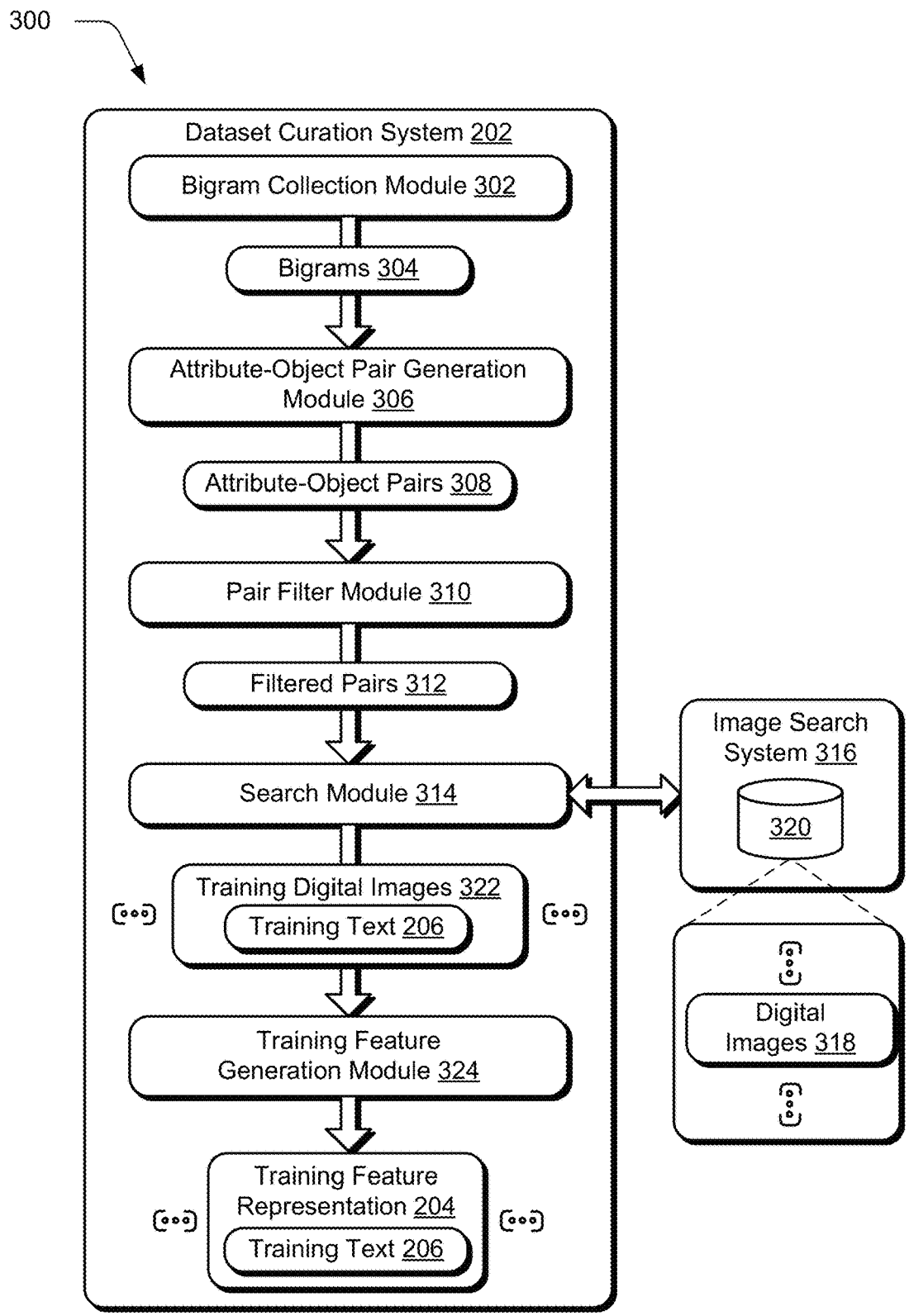
FIG. 3 depicts a system showing operation of a dataset curation system of FIG. 2 in greater detail.

FIG. 3 depicts a system 300 showing operation of the dataset curation system 202 of FIG. 2 in greater detail. The dataset curation system 202 is configured to generate a training dataset of training feature representations 204 and training text 206 to support machine learning in order to rich color profiles based on text. In one example, the training dataset is generated to support a rich and diverse set of text phrases, such as to support attribute-object pairs that are not limited to trivial color mentions that directly indicate color (e.g., "red scarf") but also include implicit indicators such as "cranberry juice" that do not directly indicate color.

To do so, a bigram collection module 302 is configured to generate bigrams 304 from a text corpus. The bigrams 304 are formed as a list of each contiguous sequence of two words present in the text corpus along with a respective frequency count. The frequency count is then used to select which bigrams 304 are passed to an attribute-object pair generation module 306 as an input. Examples of bigrams include "red apple," "electric fields," "playing football," "bright sun," "epithelial cells," "the building," and "very tall."

The attribute-object pair generation module 306 is employed by the dataset curation system 202 to generate attribute-object pairs 308 based on linguistic type of the text included in the bigrams 304. For example, the attribute-object pairs 308 are formed from the bigrams 304 such that a first word is the attribute (e.g., adjective) and a second word is the object (e.g., noun). Continuing with the previous example, this results in "red apple," "electric fields," "bright sun," and "epithelial cells" as attribute-object pairs 308.

A pair filter module 310 is used to filter the attribute-object pairs 308 to generate a set of filtered pairs 312 that pertain to the feature, for which, the machine-learning model 128 is to be trained, e.g., color. To do so in one example, the attribute-object pairs 308 are modeled as a bipartite graph between attributes and objects. Hopping logic is then employed to select relevant pairs. Hopping logic is implemented by the pair filter module 310, for instance, to start with a seed set of features (e.g., colors) as attributes and expand a list of objects (or attributes) based on frequency of occurrence for respective attributes (or objects). Again, continuing with the previous example filtering of the attribute-object pairs 308 leaves "red apple" and "bright sun" as the filtered pairs 312.

The filtered pairs 312 are then provided as an input to a search module 314. The search module 314 is configured to generate a search query based on the respective filtered pairs. A first search query, for instance, is generated for "red apple," a second search query is generated for "bright sun," and so forth. The search query is used as a basis by an image search system 316 to search a repository of digital images 318, which are illustrated as maintained in a storage device 320. A result of the image search is then used to form a set of training digital images 322 for each respective filtered pair 312. The training text 206 is the search query (i.e., the filtered pair) used to perform the image search. Although the image search system 316 is illustrated as implemented separate from the dataset curation system 202 and accessible via a network 106, this functionality is also implementable locally by the dataset curation system 202.

The training digital images 322 are then processed by a training feature generation module 324 to generate the training feature representation 204 and associated training text 206. As part of this, a color histogram representation for each of the training digital images 322 is obtained by the training feature generation module 324. Each bar in the histogram is proportional to a fraction of pixels that belong to a color bin represented by that bar, e.g., in a Lab color space have a dimension "L" for lightness and "a" and "b" for color dimensions. Because distances in a Lab space are indicative of visually perceived changes, the Lab color space is divided uniformly across three channels to create color bins.

The training feature generation module 324 is then configured to concatenate the histograms with different discretization levels. For example, two histograms combined with a number of bins along [L, a, b] axes as [9, 7, 8] and [10, 10, 10] result in a final unrolled histogram length of 9*7*8+10*10*10=1504. This is performed to address ambiguity rooted in different bin sizes along the [L, a, b] channels.

In addition to using a perceptually uniform color space, a distance function is employed by the training feature generation module 324 between these histograms to capture differences perceived with respect to human color vision. It has been observed that computing an "L2" distance between square root histograms corresponds to computing a Hellinger kernel between the two histograms. Therefore, the distance function and transformation are the "L2" distance and square root function, respectively. This implies that for the transformed histogram, the value at each bin is equal to the square root of the fraction of pixels occurring in that bin. To ease interpretation, representative color profiles are then extracted from the histograms by the training feature generation module 324 by clustering similar shades together and sampling periodically from the resulting histogram. This results in a diverse summary that captures shades of colors represented in the original histogram.

The above-mentioned color profiles (e.g., color palettes) specify uniform importance to each of the pixels in the training digital images 322. However, conditioned on the query, certain parts of the training digital images 322 are relevant to the training text 206 whereas other parts are not. Therefore, in an implementation the training feature generation module 324 is configured to identify portions of the training digital images 322 that are salient to the training text 206, i.e., the search query, and use these portions as a basis to generate the training feature representations 204.

To do so, a convolutional neural network (CNN) based classification model is employed by the training feature generation module 324 that internally uses visual attention to focus on parts of training digital images 322. The model takes the training digital images 322 as an input and predicts the attribute and object, while simultaneously learning an attention map over an entirety of the training digital images 322, respectively. Normalized attention weights are also employed to specify different amounts of relevance of pixels to the training text 206. For example, by focusing on a salient portion of a training digital image 322 for training text 206 of "blond hair" the training feature representation 204 results in a color profile with peaks towards blond and ignores portions of the training digital images 322 of the background, regardless of color. The training feature representation 204 and training text 206 are then provided as an input to a text-to-feature system 126 to train a machine-learning model 128 which is described in greater detail below.

Figure 4:
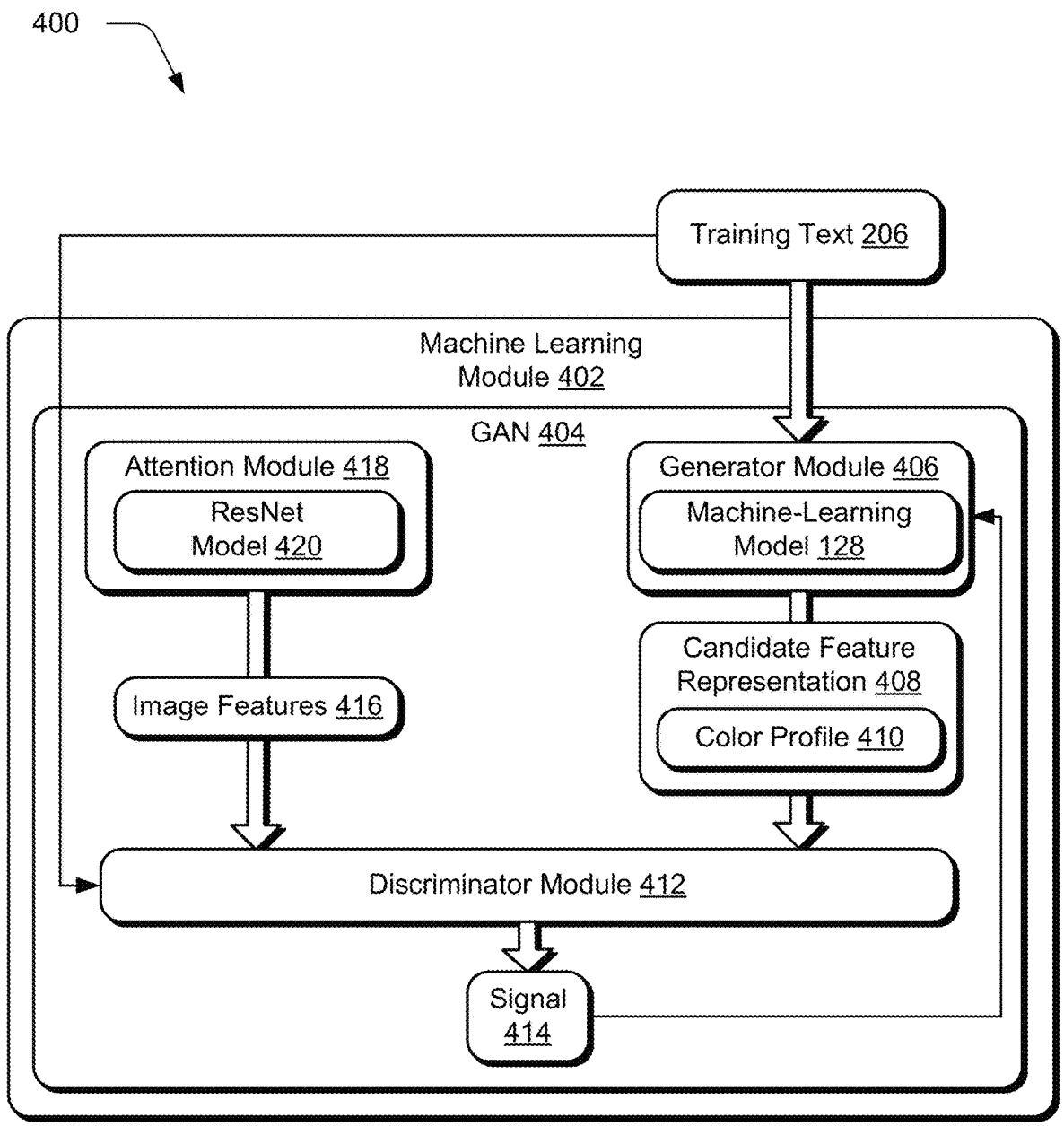
FIG. 4 depicts a system in an example implementation showing training of a machine-learning model using a generative adversarial network (GAN).
Figure 5:
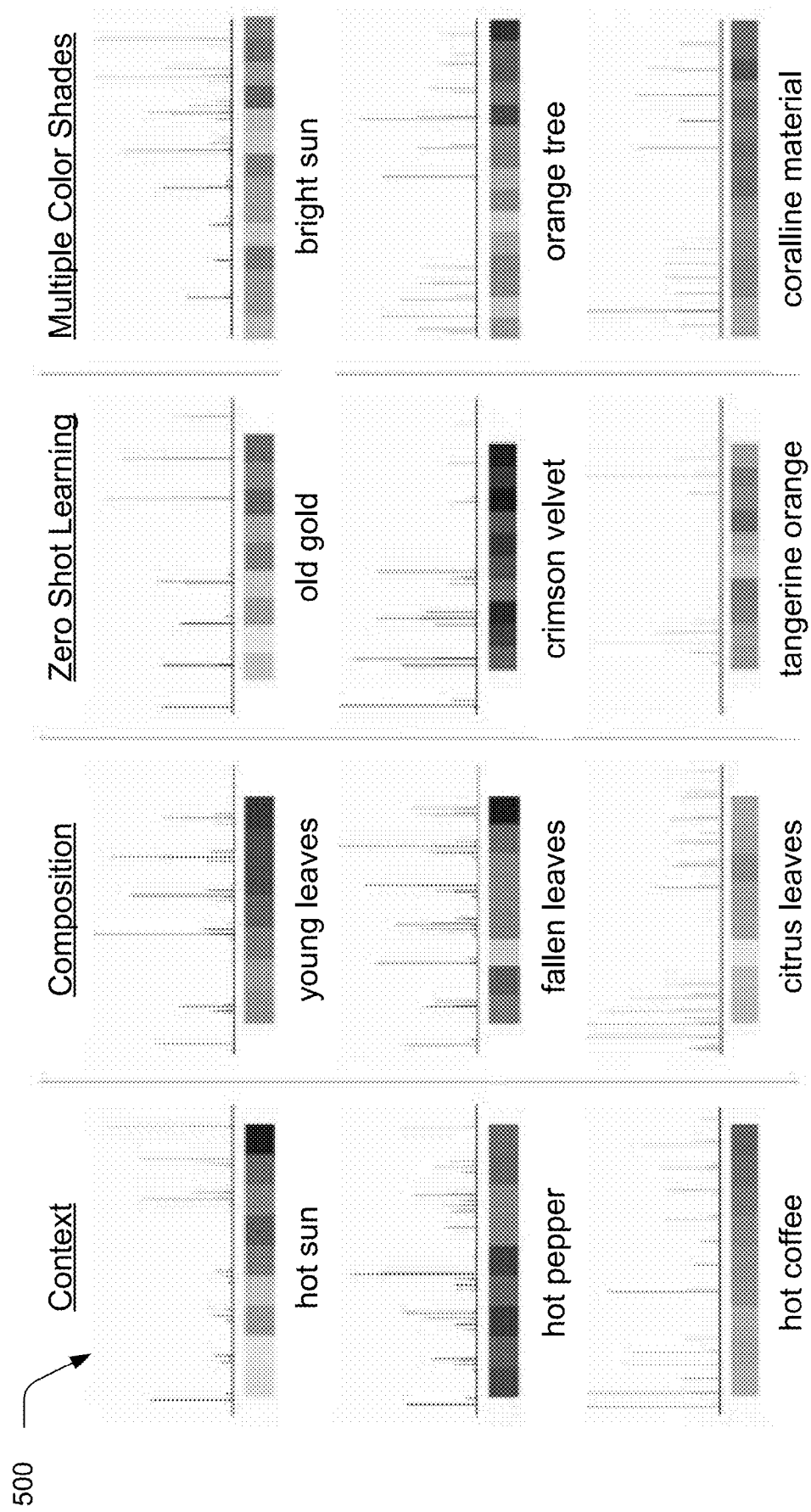
FIG. 5 depicts an example implementation showing feature representations generated for a corresponding text user input using the machine-learning model trained as part of the GAN of FIG. 4.

FIG. 4 depicts a system 400 in an example implementation showing training of the machine-learning model 128 by a machine learning module 402 using a generative adversarial network (GAN) 404. The machine learning module 402 implements a generative adversarial approach using the training dataset generated in FIG. 3 to generate feature representations by leveraging the concepts of compositionality and context.

In the illustrated GAN 404, the generator module 406 implements the machine-learning model 128 as a neural network that is tasked with generating plausible candidate feature representations 408, e.g., color profiles 410, conditioned on a text embedding. The discriminator module 412 is tasked with distinguishing between "real" color profiles (i.e., the training feature representations 204) and "fake" ones from the generator module 406, i.e., the candidate feature representation 408. Thus, the generator module 406 attempts to fool the discriminator module 412, while the discriminator module 412 attempts to get past this screening process, leading to a battle of sorts between the two neural networks.

Generating the candidate feature representation 408 to represent visual features solely from text is challenging because the perception of visual features such as color is naturally rooted in the visual domain. To address this challenge, a multimodal approach is employed by the machine learning module 402 to learn candidate feature representations 408, e.g., color profiles, in which image modality is employed solely by the discriminator module 412 and not the generator module 406.

Therefore, the training text 206 as text embeddings are the sole input into the generator module 406 in the illustrated example. The input to the discriminator module 412, on the other hand, includes (1) the training text 206 as text embeddings, (2) the candidate feature representation 408 (e.g., color profile 410) output by the generator module 406, and (3) image features 416 computed by an attention module 418, e.g., using a pretrained ResNet model 420. The discriminator module 412 outputs a signal 414 (e.g., score) to guide learning of the generator module 406, derived in part from the image modality as expressed in the image features 416.

In an implementation, task-aware connections are also employed by the generator module 406 to improve text modality conditioning. This is done by injecting a text embedding of the training text 206 into various stages/layers of the machine-learning model 128 thereby making intermediate layers of the machine-learning model 128 aware of the initial task. The text embedding is a trainable embedding matrix initialized by glove word embeddings. Different embedding matrices for attributes and nouns enable the machine-learning model 128 to learn compositionality in (attribute, object) pairs. This is done to capture the intuition that the same item of text (i.e., word) can multiple interpretations depending on its part-of-speech (POS) tag.

The GAN 404 is trained using the training feature representations 204 (e.g., as attention weighted color profiles) described in relation to FIG. 3. An alternating training scheme is employed, in which the discriminator module 412 is trained for a number of iterations (e.g., ten epochs) followed by training the generator module 406 for a number of iterations, e.g., ten epochs. This alternating training scheme functions to stabilize learning, as the discriminator module 412 and the generator module 406 are given sufficient iterations each to be able to train smoothly, before their adversarial combination improved in performance.

A variety of loss functions are usable by the GAN 404 as part of training. In one example, a modified version of a Least Squares GAN (LSGAN) objective is employed as follows:

$$\min V_{LSGAN}(D) = \tfrac{1}{2} E_{x \sim P_{data}(x)}[(D(x)-1)^2] + \tfrac{1}{2} E_{z \sim p_z(z)}[(D(G(z)))^2]$$

$$\min V_{LSGAN}(G) = \tfrac{1}{2} E_{z \sim p_z(z)}[(D(G(z))-1)^2]$$

Here, D(x) represents the signal 414 (i.e., output score) of the discriminator module 412 on passing the true color profile, along with the text embedding of the (attribute, object) pair from the training text 206, and the image features 416. "D(G(z))" represents the output score of the discriminator module 412 on passing the candidate feature representation 408 (e.g., the generated color profile output by the generator module 406), the text embedding of the (attribute, object) pair from the training text 206, and the image features 416.

Thus, the generator module 406 trains the machine-learning model 128 to maximize a score of the signal 414 given by the discriminator module 412 to its candidate feature representation 408. The discriminator module 412, on the other hand, trains to minimize the score given to "fake" candidate feature representations 408 and maximize the score of the signal 414 given to "real" training feature representations 204.

This objective is further modifiable by giving additional weighting to the squared L2 norm between the candidate feature representations 408 and the training feature representations 204 in the loss function of the generator module 406. Thus, the final objective for the generator module 406 is:

$$\min V_{LSGAN}(G) = \tfrac{1}{2} E_{z \sim p_z(z)}[(D(G(z))-1)^2] + \tfrac{\lambda}{m}(G(z)-x)^2$$

where m is a length of the color profile x, i.e., m=1504 and λ is a regularization hyperparameter, whose value is set as one thousand after experimentation. Adding the L+distance separately in the objective function of the generator module 406 assists in combating mode collapse (commonly encountered while training GAN's) and stabilizes training.

FIG. 5 depicts an example implementation 500 showing feature representations 130 generated for a corresponding text user input 118 using the machine-learning model 128 trained as part of the GAN 404 of FIG. 4. The feature representations 130 are illustrated as color profiles in this example. In the left column, the feature representations illustrate an ability of the machine-learning model 128 to address context. For example, the attribute "hot" has different effects when modifying different objects such as "sun", "pepper" and "coffee". The machine learning model 128 also addresses the notion of composition, e.g., "young leaves" are rich in green color whereas "fallen leaves" are represented well in the brown-to-red spectrum and "citrus leaves" are yellowish.

The machine learning model 128 also learns meaningful color representations for unseen combinations of (attribute, object) pairs. For "old gold", "crimson velvet" and "tangerine orange," the generated color profiles reasonably capture the semantics of the queries. This demonstrates effective zero-shot learning of the machine-learning model 128, Another interesting behavior is the ability of the machine-learning model 128 to highlight multiple colors. For the query "bright sun," the machine-learning model 128 has learned that on a bright day, a golden yellow sun is visible in a blue sky. Similarly, for the queries "orange tree" and "coralline material", the machine-learning model 128 has learned to represent their diverse nature as illustrated. Having described an example of training and use of the machine-learning model 128 to generate a feature representation 130 based on a text user input 118, the following discussion proceeds to use of this feature representation 130 in editing a digital image 114, e.g., to edit a digital object 116 included in the digital image 114.

Digital Image Editing

Figure 6:
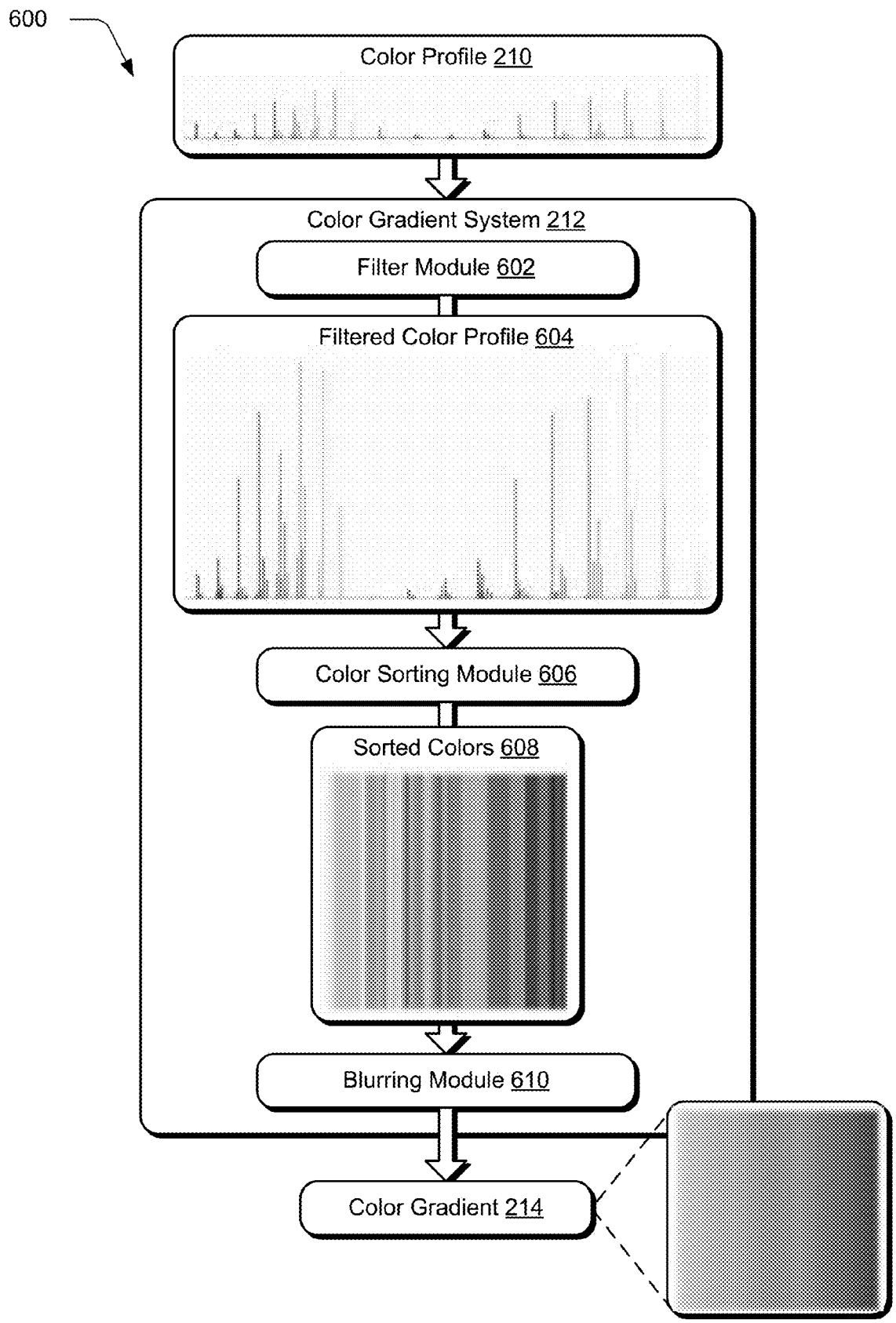
FIG. 6 depicts a system in an example implementation showing operation of a color gradient system of FIG. 2 in greater detail as generating a color gradient from a color profile included as part of a feature representation.

FIG. 6 depicts a system 600 in an example implementation showing operation of the color gradient system 212 of FIG. 2 in greater detail as generating a color gradient 214 from a color profile 210 included as part of a feature representation 130. As described above, text is used to support an effective user interface to capture subtle variations in creating and editing digital images. Forming associations between appearances and the objects that users are exposed to in everyday life is innate in human perception. Therefore, specifying the target object itself in order to apply subtle design modifications and therefore context to attributes comes naturally. For example, an ability for a content creator to specify that a handbag is to look like a "lush lawn" has increased efficiency and captures nuances that are difficult to achieve through manual selection of distinct shades of green. In the follow discussion, this functionality is leveraged to support use of text as "filters" for enhanced digital image editing.

As described in relation to the pipeline of FIGS. 1 and 2, a text user input 118 describing an attribute and object pair of interest is input to our text-to-feature encoder system 208 (e.g., as typed text, a spoken utterance and subsequent use of speech-to-text functionality) to generate a feature representation 130, e.g., a color profile 210 in the form of a histogram. In this example, a heuristic-based approach is applied by the color gradient system 212 to convert the color profile 210 to a color gradient 214 (e.g., as a patch) which is to be applied to the digital object 116 to be edited in the digital image 114. This is performed by creating an outline of the digital object 116 (e.g., a sketch using edge detection techniques) and then transferring the color gradient 214 onto the outline using a texture system 216 as further described in relation to FIGS. 8-10.

The color gradient system 212 begins in the illustrated example of FIG. 6 by "squaring" the color profile 210, e.g., such that heights of colors or respective color bins are proportional to a fraction of pixels belonging to that color bin. Colors which are "too dark" or "too light" are also filtered to retain bright colors to form the filtered color profile 604. This is done using a thresholding technique based on saturation and lightness vales in the HSV color space by the filter module 602.

The filtered color profile 604 is then provided as an input to a color sorting module 606. The color sorting module 606 is configured to generate sorted colors 608 as an ordering of color bins based on respective distances in a Lab space. This is performed by the color sorting module 606 to achieve a relatively smooth transition between adjacent colors, i.e., adjacent colors differ minimally in terms of visual perception. In the illustrated example, an anchor color is set as "black" and distances of each of the other colors in the filtered color profile 604 are computed from this anchor. The Lab space is employed to capture visually perceptible distances in the form of Euclidean distance, which are used as keys to sort the color bins within the sorted colors 608.

The sorted colors 608 are then provided as an input to a blurring module 610 to generate the color gradient 214. The sorted colors 608, for instance, are first used to form a patch in which a proportion of each color is weighted by height. A Gaussian blur function is applied on the patch to achieve a smooth gradient between colors. The color gradient 214 is then output by the color gradient system 212 to a texture system 216 as shown in FIG. 2 in order to edit the digital object 116 in the digital image 114, further discussion of which is included in the following description.

Figure 7:
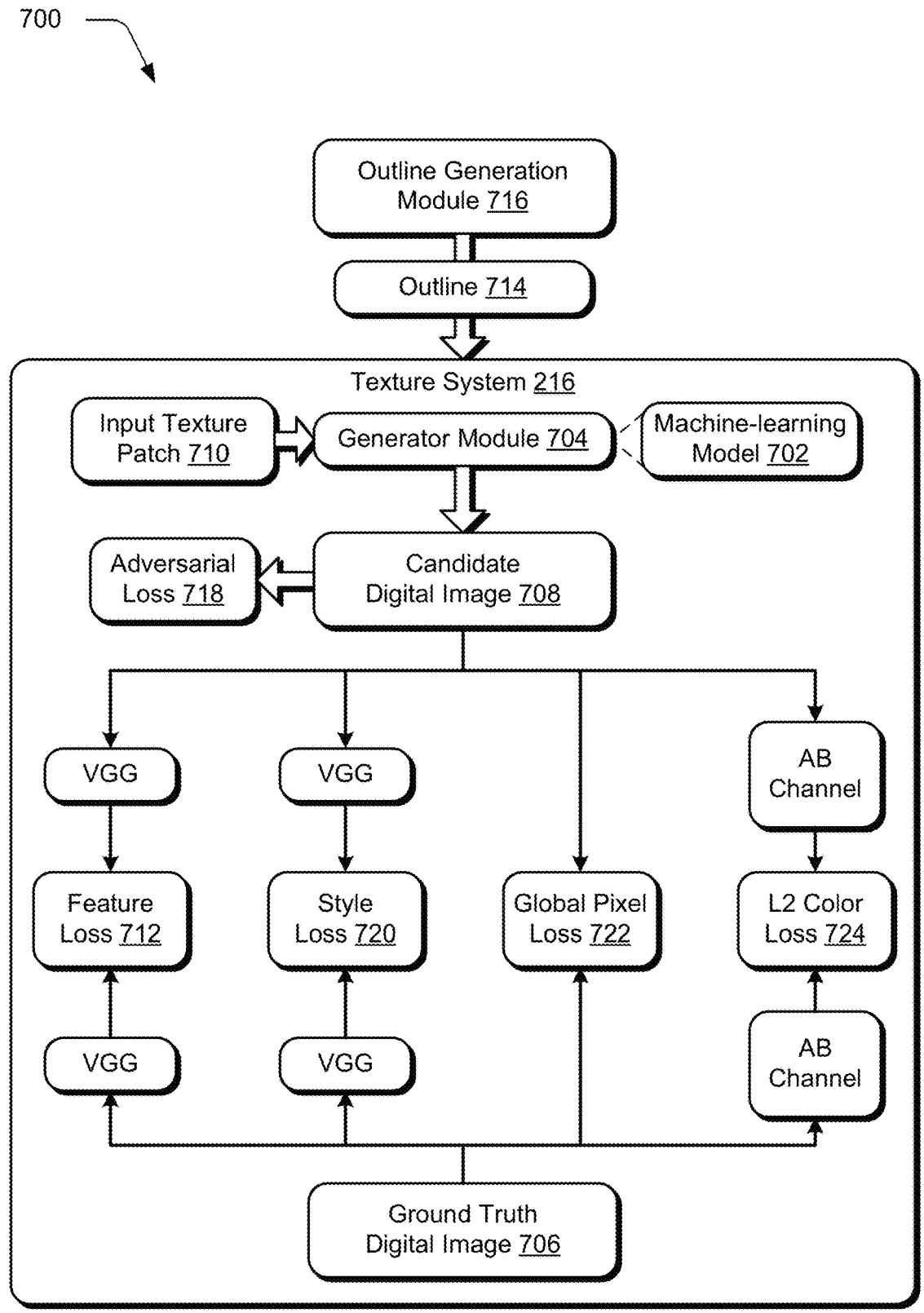
FIG. 7 depicts a system in an example implementation of a first stage involving ground truth pretraining of a machine-learning model of a texture system of FIG. 2 in order to support digital image editing.
Figure 8:
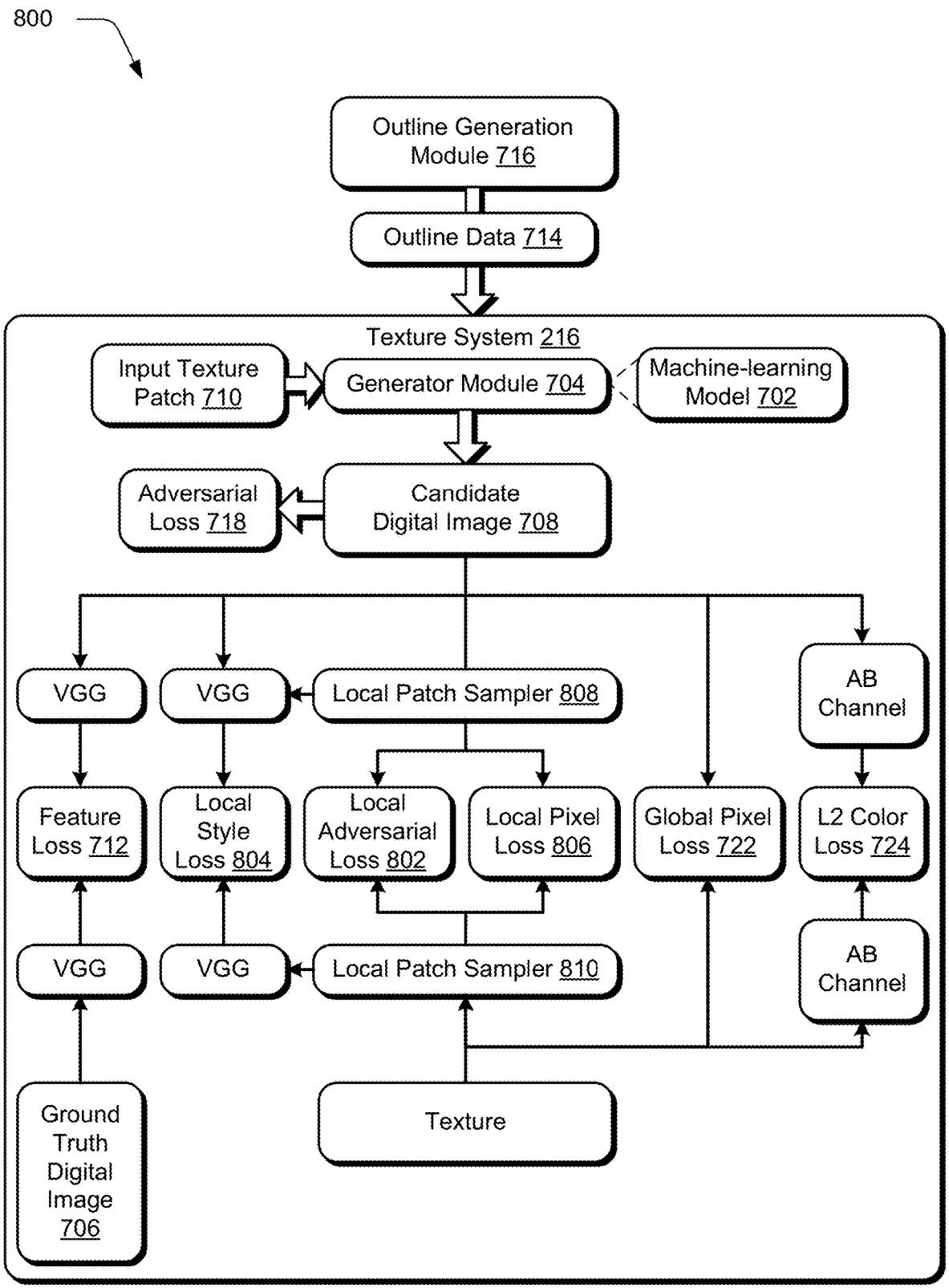
FIG. 8 depicts a system in an example implementation of a second stage involving external texture fine tuning of the machine-learning model of FIG. 7 of the texture system.

Continuing with the previous color-based examples of features used to edit images, the texture system 216 in the following discussion demonstrates use of colors generated from text along with texture to edit digital images. A training pipeline used to train a machine-learning model 702 used by the texture system 216 to edit the digital image includes two phases. FIG. 7 depicts a system 700 in an example implementation of a first stage involving ground truth pretraining of a machine-learning model 702 of a texture system 216 in order to support digital image editing. FIG. 8 depicts a system 800 in an example implementation of a second stage involving external texture fine tuning of the machine-learning model 702 of FIG. 7 of the texture system 216.

In the first phase of FIG. 7, the machine learning model 702, as part of a generator module 704 of a GAN, is pretrained to reproduce a ground truth digital image 706 as a candidate digital image 708 from synthetically sampled inputs of an input texture patch 710. The objective function in this stage is a combination of multiple losses, each of which is designed to focus on different aspects of the ground truth digital image 706. The feature loss component $L_F$ 712 guides the candidate digital image 708 generated by the machine-learning model 702 to loosely follow the object structures specified by an outline 714 generated by an outline generation module 716, e.g., using edge detection.

The adversarial loss term $L_{adv}$ 718 pushes the machine-learning model 702 to synthesize sharper images with increased realism. Further, a style loss component $L_S$ 720 is used to capture texture details present in the input texture patch 710, while the pixel loss $L_p$ 722 and color loss $L_c$ 724 components stabilize learning and penalize deviation in color of the candidate digital image 708 from that of the ground truth digital image 706, respectively. Therefore, the final objective function used for pre-training in this example is defined as follows:

$$L=L_F+w_{ADV}L_{ADV}+w_SL_S+w_PL_P+w_CL_C$$

where $w_{ADV}$, $w_S$, $w_P$, and $w_C$ are the regularization hyperparameters for adversarial, style, pixel, and color losses respectively.

Machine learning based on ground truth digital images 706, solely, makes it difficult for the machine-learning model 702 to focus on finer details, like texture, given the other content in the ground truth digital image 706. To propagate learning to a broader range of unseen textures, the machine-learning model 702 is further "fine-tuned" to reproduce and propagate textures which had no ground truth image.

As shown in the second phase of FIG. 8, local texture loss is introduced as part of the objective function, and loss components of the pre-training stage are adapted to support improved capture of finer details. Local texture loss $L_t$ incorporates three loss terms—a local adversarial loss $L_{adv}$ 802 to facilitate learning by discriminating between different texture patches, as well as local style loss $L_S$ 804 and local pixel $L_p$ 806 losses to match the cropped patches generated by respective local patch samplers 808, 810. Thus, the local texture loss designed to encourage realistic texture generation is represented as follows:

$$L_t=L_S+w_PL_P+w_{adv}L_{adv}$$

where $w_P$ and $w_{adv}$ are the regularization hyperparameters for the local style and local adversarial losses, respectively. In addition to this, the feature loss $L_F$ 712 and adversarial loss $L_{adv}$ 718 are kept unchanged, while the pixel loss $L_P'$ and color loss $L_C'$ are modified to compare a generated result of the candidate digital image 708 with the input texture patch 710 (since there is no ground truth output image for comparison). Thus, the final objective function for external texture fine-tuning is represented as follows:

$$L=L_F+w_{ADV}L_{ADV}+w_PL_P'+w_CL_C'+L_t$$

where $w_{ADV}$, $w_P$ and $w_C$ are the regularization hyperparameters for the adversarial, modified pixel and modified color loss components, respectively. The machine-learning model 702, once trained, is then configured to implement editing of digital images, examples of which are described as follows.

Figure 9:
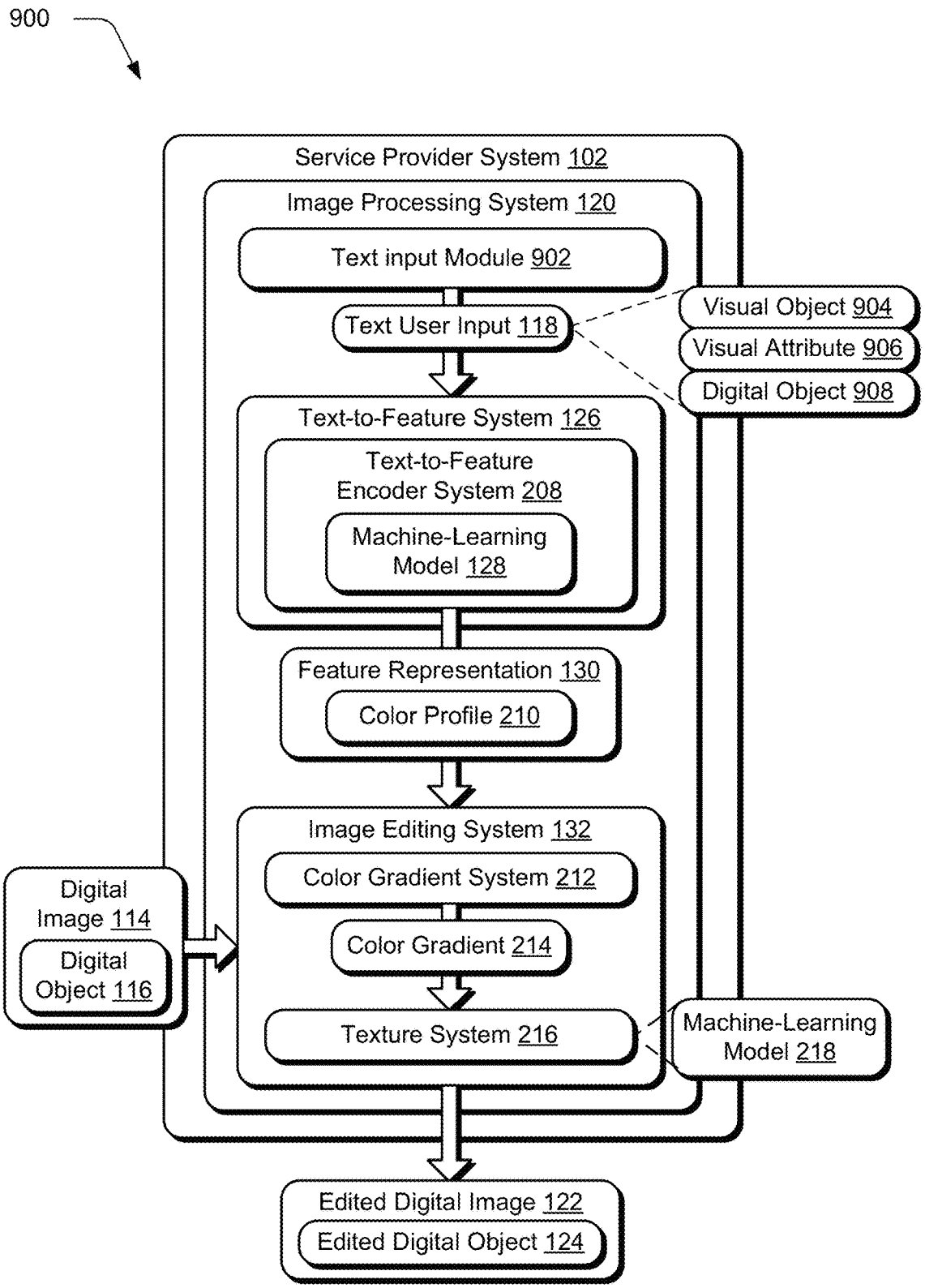
FIG. 9 depicts a system in an example implementation in which a digital object of a digital image is edited based on a text user input using the text-to-feature system and image editing system that are trained as described in FIGS. 2-8.
Figure 10:
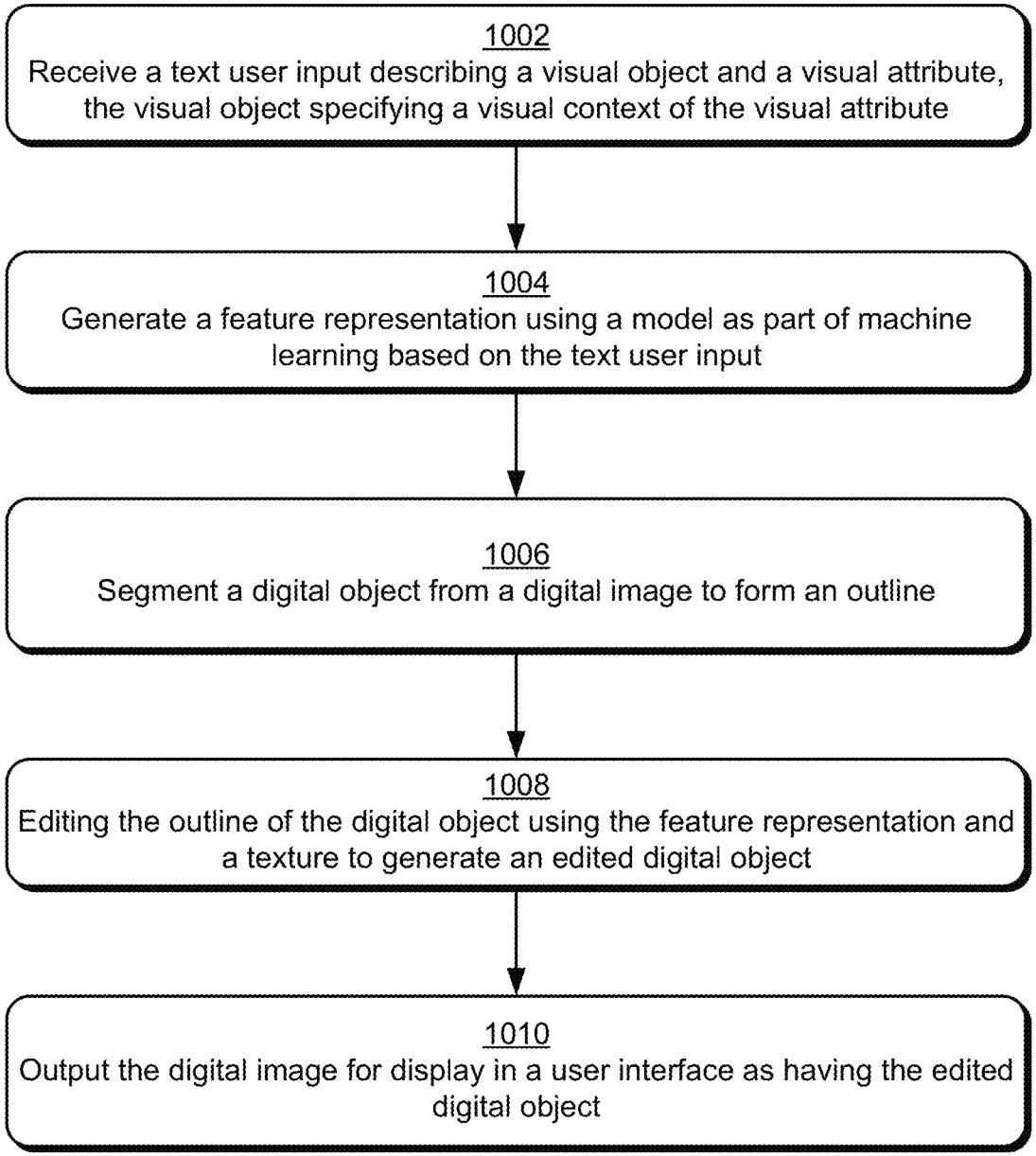
FIG. 10 is a flow diagram depicting a procedure in an example implementation of text editing of digital images.

FIG. 9 depicts a system 900 in an example implementation in which a digital object of a digital image 114 is edited based on a text user input 118 using the text-to-feature system 126 and image editing system 132 that are trained as described in FIGS. 2-8. FIG. 10 depicts a procedure 1000 in an example implementation of text editing of digital images.

The following discussion describes techniques that may be implemented utilizing the previously described systems and devices. Aspects of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

A text user input 118 is received by a text input module 902. The text user input 118 describes a visual object and a visual attribute, in which the visual object specifies a visual context of the visual attribute (block 1002). The text user input 118, for instance, may be received as a typed input via a user interface, generated from a spoken utterance using speech-to-text functionality, and so on. The text user input 118 in the illustrated example references a visual object 904 and a visual attribute 906 that is defined in a context of the visual object 904, e.g., "ripe mango." The text user input 118 also identifies a digital object 908 that is to be edited, e.g., the rendering 134 of the digital object 116 in FIG. 1. This may be performed locally at the service provider system 102, received via the network 106 from the computing device 104, etc.

A feature representation 130 is generated by a text-to-feature system 126 using a model (e.g., machine-learning model 128) as part of machine learning based on the text user input (block 1004). The text-to-feature system 126, for instance, generates the feature representation 130 to represent visual features evoked by text, such as color, texture, luminance, and so forth. In the instance of a color profile 210, the feature representation 130 includes a plurality of colors typically inspired in a user's imagination upon hearing/reading the text user input 118, such as darker browns for "dry leaves."

The feature representation 130 is then passed to the image editing system 132 to edit the digital object 908 in the digital image. To begin, the image editing system 132 segments the digital object from the digital image to form an outline (block 1006), e.g., using edge detection techniques. This process may also include object recognition text to identify the digital object 908 within the digital image, e.g., using machine learning, based on the text user input 118.

The outline of the digital image is edited using the feature representation and a texture to generate an edited digital object (block 1008). The image editing system 132, for instance, generates a color gradient 214 from the color profile 210 of the feature representation 130 using the techniques described in relation to FIG. 6. The color gradient 214 is then passed to a texture system 216 that employs the color gradient 214 to edit the digital object 116 within the digital image 114. The texture system 216, for instance, employs a machine-learning model 218 trained as described in relation to FIGS. 7 and 8 to apply the texture to the outline of the digital object 116. The edited digital image 122 having the edited digital object 124 are then output for display in a user interface 110 (block 1010). In an example, the image processing system 120 performed this to generate a plurality of edited digital images 122 (e.g., using different feature representations 130 and/or textures) that are output for display in the user interface 110 for user selection. A variety of other examples are also contemplated.

Example System and Device

Figure 11:
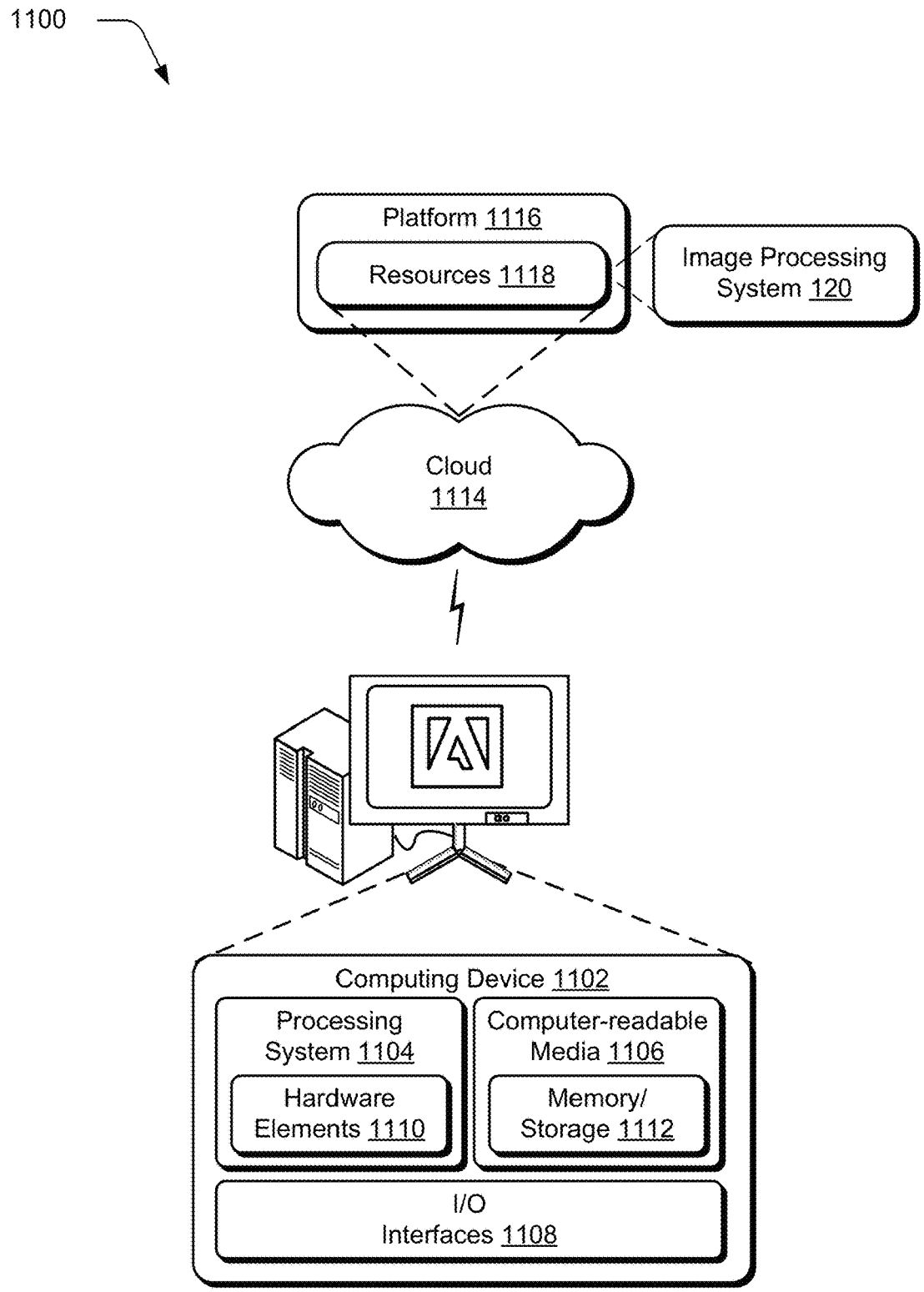
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the image processing system 120. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, a text user input describing a visual object and a visual attribute, the visual object specifying a visual context of the visual attribute;
generating, by the processing device, a feature representation that includes a color profile based on the visual context of the text user input using a generator, the generator trained as part of a generative adversarial network using training text and training feature representations generated from training digital images located based on an image search performed using the training text;
editing, by the processing device, a digital image based on the feature representation; and
outputting, by the processing device, the edited digital image for display in a user interface.

2. The method as described in claim 1, wherein the visual object references a physical object and the visual attribute describes an appearance of the physical object.

3. The method as described in claim 1, wherein the text user input also specifies a digital object included in the digital image, further comprising detecting the digital object in the digital image and wherein the editing includes editing the digital object in the digital image and not editing another portion of the digital image.

4. The method as described in claim 1, wherein the visual object does not refer to a digital object in the digital image being edited based on the feature representation.

5. The method as described in claim 1, wherein the training text is semantically similar to the text user input.

6. The method as described in claim 1, wherein:
the generator of the generative adversarial network receives as an input the training text as part of training the generator; and
a discriminator of the generative adversarial network receives as an input the training text, image features extracted from the training digital images using machine learning, and a candidate feature representation generated by the generator as part of the training of the generator.

7. The method as described in claim 1, wherein the feature representation further includes one or more of a texture, contrast, lighting, or luminance based on the visual context.

8. The method as described in claim 1, wherein the color profile includes a color histogram representation.

9. The method as described in claim 1, wherein the editing the digital image includes generating a color gradient to apply to the digital image based on the color profile.

10. A system comprising:
a memory component; and
a processing device coupled to the memory component, the processing device to perform operations comprising:
  receiving a text user input describing a visual object and a visual attribute, the visual object specifying a visual context of the visual attribute;
  generating a feature representation that includes a color profile based on the visual context using a generator, the generator trained as part of a generative adversarial network using training text and training feature representations;
  editing a digital image based on the feature representation; and
  outputting the edited digital image for display in a user interface.

11. The system as described in claim 10, wherein the visual object references a physical object and the visual attribute describes an appearance of the physical object.

12. The system as described in claim 10, wherein editing the digital image includes segmenting a digital object from the digital image using one or more edge detection techniques and applying a color gradient to the digital object based on the feature representation.

13. The system as described in claim 10, wherein the training text includes a plurality of attribute-object pairs that are semantically similar to the text user input.

14. The system as described in claim 10, wherein the training feature representations are generated from training digital images located based on an image search performed using the training text.

15. The system as described in claim 14, wherein the generator of the generative adversarial network receives as an input the training text as part of training the generator; and
  a discriminator of the generative adversarial network receives as an input the training text, image features extracted from the training digital images using machine learning, and a candidate feature representation generated by the generator as part of the training of the generator.

16. The system as described in claim 10, wherein the feature representation further includes one or more of a texture, contrast, lighting, or luminance based on the visual context.

17. A non-transitory computer-readable medium storing executable instructions, which when executed by a processing device, the processing device performs operations comprising:
  receiving a text user input that includes a visual attribute and a visual object that specifies a visual context of the visual attribute, the text user input identifying a digital object in a digital image to be edited;
  generating a feature representation that includes a color profile based on the visual context using a machine learning model;
  segmenting the digital object from the digital image to form an outline of the digital object;
  editing the outline of the digital object based on the feature representation; and
  outputting the digital image as having the edited digital object for display in a user interface.

18. The non-transitory computer-readable medium as described in claim 17, wherein the machine learning model includes a generator trained as part of a generative adversarial network using training text and training feature representations generated from training digital images located based on an image search performed using the training text.

19. The non-transitory computer-readable medium as described in claim 17, wherein the visual object references a physical object and the visual attribute describes an appearance of the physical object.

20. The non-transitory computer-readable medium as described in claim 17, wherein editing the digital object includes applying a texture and one or more colors within the outline of the digital object by a texture machine learning model based on the feature representation.

* * * * *